(12) United States Patent
Chang

(10) Patent No.: US 7,924,512 B2
(45) Date of Patent: Apr. 12, 2011

(54) LENS MODULE WITH EXTENSION MEMBER

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 50 days.

(21) Appl. No.: 12/487,562

(22) Filed: Jun. 18, 2009

(65) Prior Publication Data
US 2010/0061001 A1    Mar. 11, 2010

(30) Foreign Application Priority Data
Sep. 10, 2008   (CN) .......................... 2008 1 0304454

(51) Int. Cl.
*G02B 7/02*    (2006.01)

(52) U.S. Cl. .................. 359/811; 359/813; 359/814

(58) Field of Classification Search ............ 359/811, 359/813, 814, 819, 821, 822, 823–825
See application file for complete search history.

(56) References Cited

U.S. PATENT DOCUMENTS

| 7,511,900 B2 * | 3/2009 | Imagawa et al. | 359/813 |
| 7,535,662 B2 * | 5/2009 | Hong et al. | 359/819 |

\* cited by examiner

*Primary Examiner* — Timothy J Thompson
(74) *Attorney, Agent, or Firm* — Raymond J. Chew

(57) ABSTRACT

A lens module includes a lens barrel, a lens holder, and an extension member. The lens barrel is received in the lens holder. The lens holder includes at least one first guiding portion. The extension member defines a receiving through hole and includes at least one second guiding portion corresponding to the at least one first guiding portion. The lens holder is fixedly received in the receiving through hole by engagement between the at least one first guiding portion and the at least one second guiding portion.

12 Claims, 3 Drawing Sheets

LENS MODULE WITH EXTENSION MEMBER

BACKGROUND

1. Technical Field

The present disclosure relates to lens modules and particularly, to a lens module with an extension member.

2. Description of Related Art

Lens modules are widely used in various electronic devices, such as cellphones and multi-media players. When the lens module is assembled in these electronic devices, a dimension of the lens module is designed to compatible with assembly of theses electronic devices. However, a specific lens module is only compatible with a specific model of these electronic devices. Therefore, other remaining lens modules except the specific lens module may be wasted since the other lens modules may not be able to be assembled to the specific model of these electronic devices.

Therefore, what is needed is to provide a lens module with an extension member, in which the above problem is eliminated or at least alleviated.

DETAILED DESCRIPTION

Figure 1:
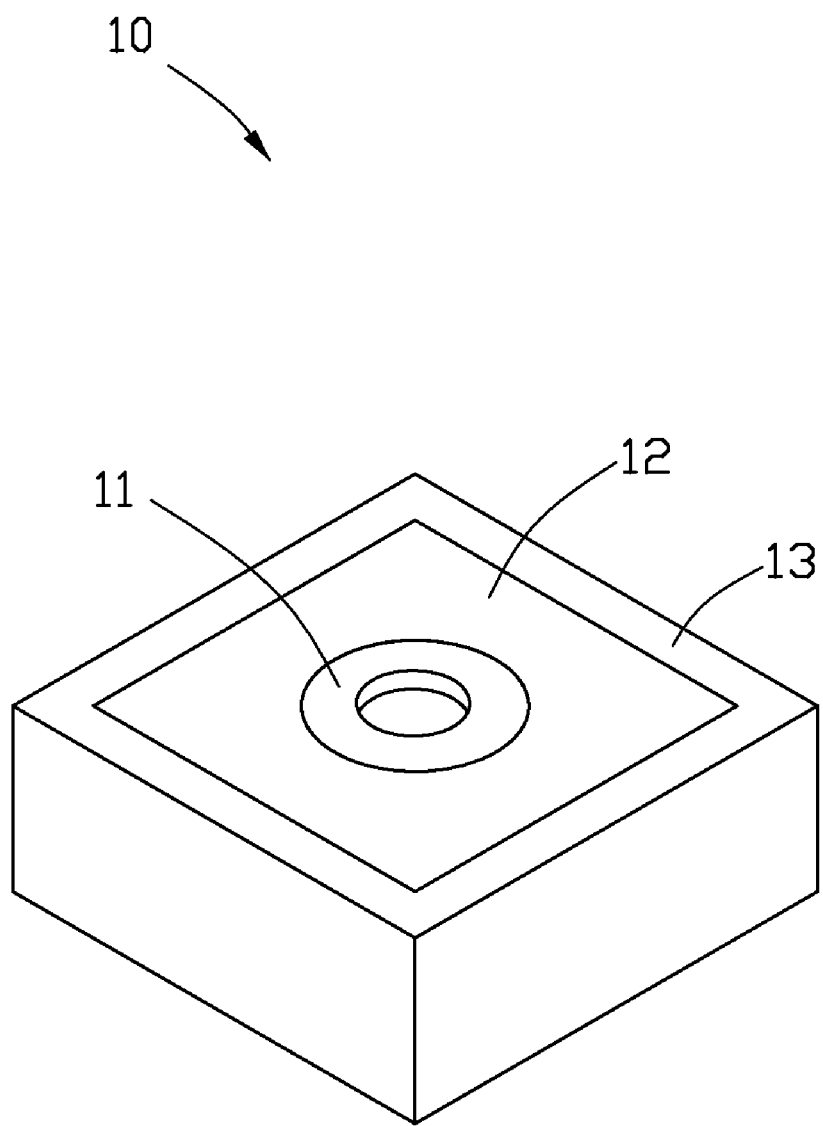
FIG. 1 is an isometric view of a lens module, according to an exemplary embodiment.
Figure 2:
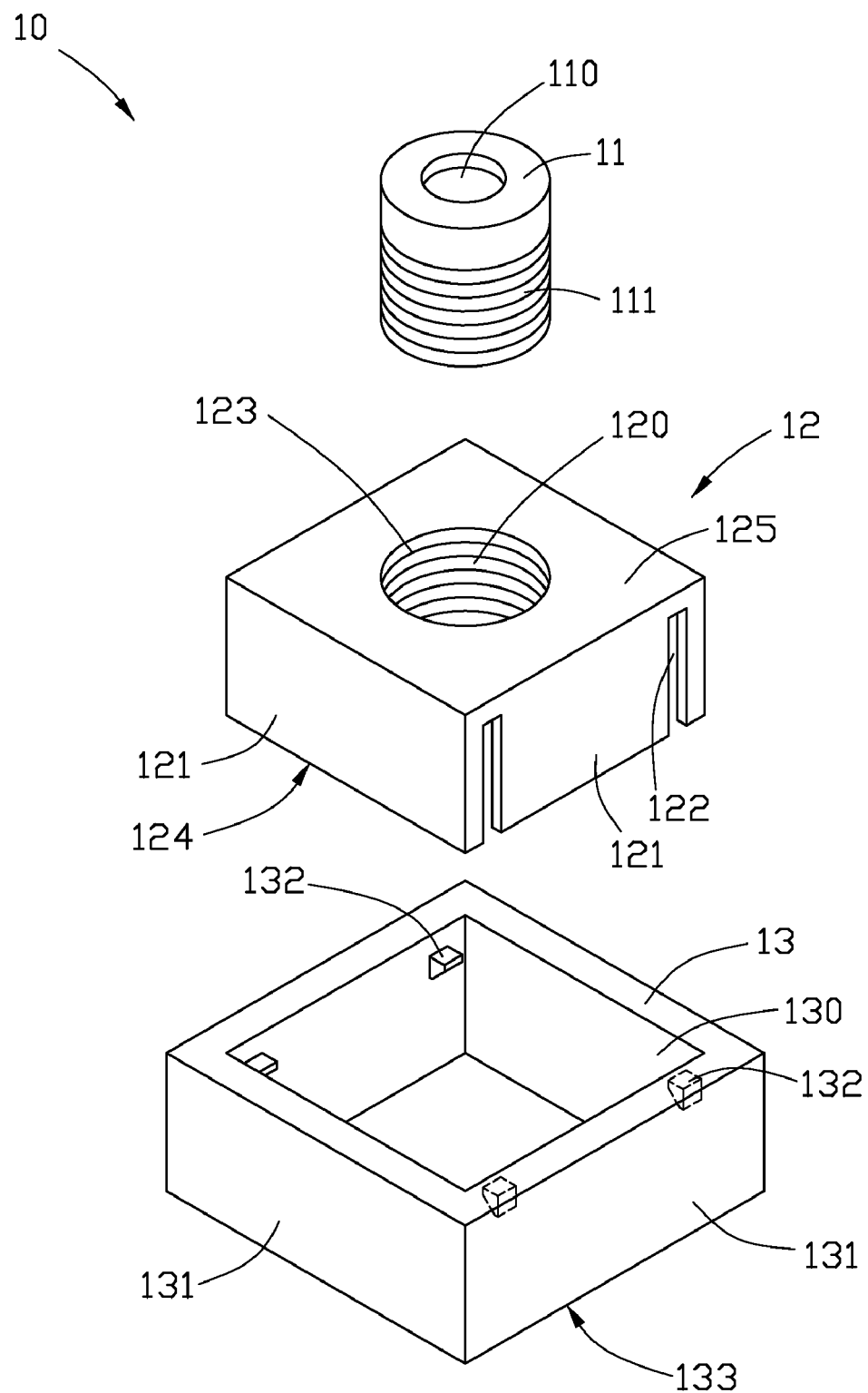
FIG. 2 is a partially dissembled isometric view of the lens module of FIG. 1.

Referring to FIGS. 1 and 2, a lens module 10, according to an exemplary embodiment, includes a lens barrel 11, a lens holder 12, and an extension member 13. The lens barrel 11 is received in the lens holder 12. The lens holder 12 is received in the extension member 13.

The lens barrel 11 is a hollow cylinder and includes an outer thread 111 formed at an outer surface thereof. A lens group 110 is received in the lens barrel 11.

The lens holder 12 is substantially cube-shaped and includes four side outer surfaces 121, an upper surface 125, and a holding bottom surface 124 parallel to the upper surface 125. The four side outer surfaces 121 connect the upper surface 125 to the holder bottom surface 124. A through hole 120 is defined through the upper surface 125 to the holder bottom surface 124. The lens holder 12 further includes an inner thread 123 formed in an inner wall of the through hole 120. Therefore, the lens barrel 11 is screwed into the through hole 120 with the outer thread 111 engaging with the inner thread 123. Two elongated guiding grooves 122 are defined in one of the side outer surfaces 121, and another two elongated guiding grooves 122 are defined in an opposite one of the side outer surfaces 121. The four elongated guiding grooves 122 each extend parallel to an optical axis of the lens group 110.

The extension member 13 is also substantially cube-shaped and includes four side walls 131. A receiving through hole 130 is bounded by the four side walls 131, for fixedly receiving the lens holder 12 therein. Each side wall 131 includes a bottom surface 133. Two guiding protrusions 132 are formed on an inner surface of one side wall 131 in the receiving through hole 130, and another two guiding protrusions 132 are formed on an inner surface of an opposite side wall 131 in the receiving through hole 130 Each pair of guiding protrusions 132 corresponds to the two respective elongated guiding grooves 122. A distance between each guiding protrusion 132 and the bottom surface 133 of the side wall 131 where the protrusion 132 is formed is equal to a length of the corresponding elongated guiding groove 122. The lens holder 12 is fixedly received in the receiving through hole 130 by the protrusions 132 engaging in the elongated guiding grooves 122. Therefore, a dimension of the lens module 10 can be adjusted without redesigning the lens barrel 11 and the lens holder 12, and the lens module 10 with the extension member 13 can be assembled to other electronic devices.

It is to be understood that in other embodiment, number of the guiding groove 122 defined in one side outer surface 121 and the protrusion 132 on one side wall 131 may be one, three or more.

Figure 3:
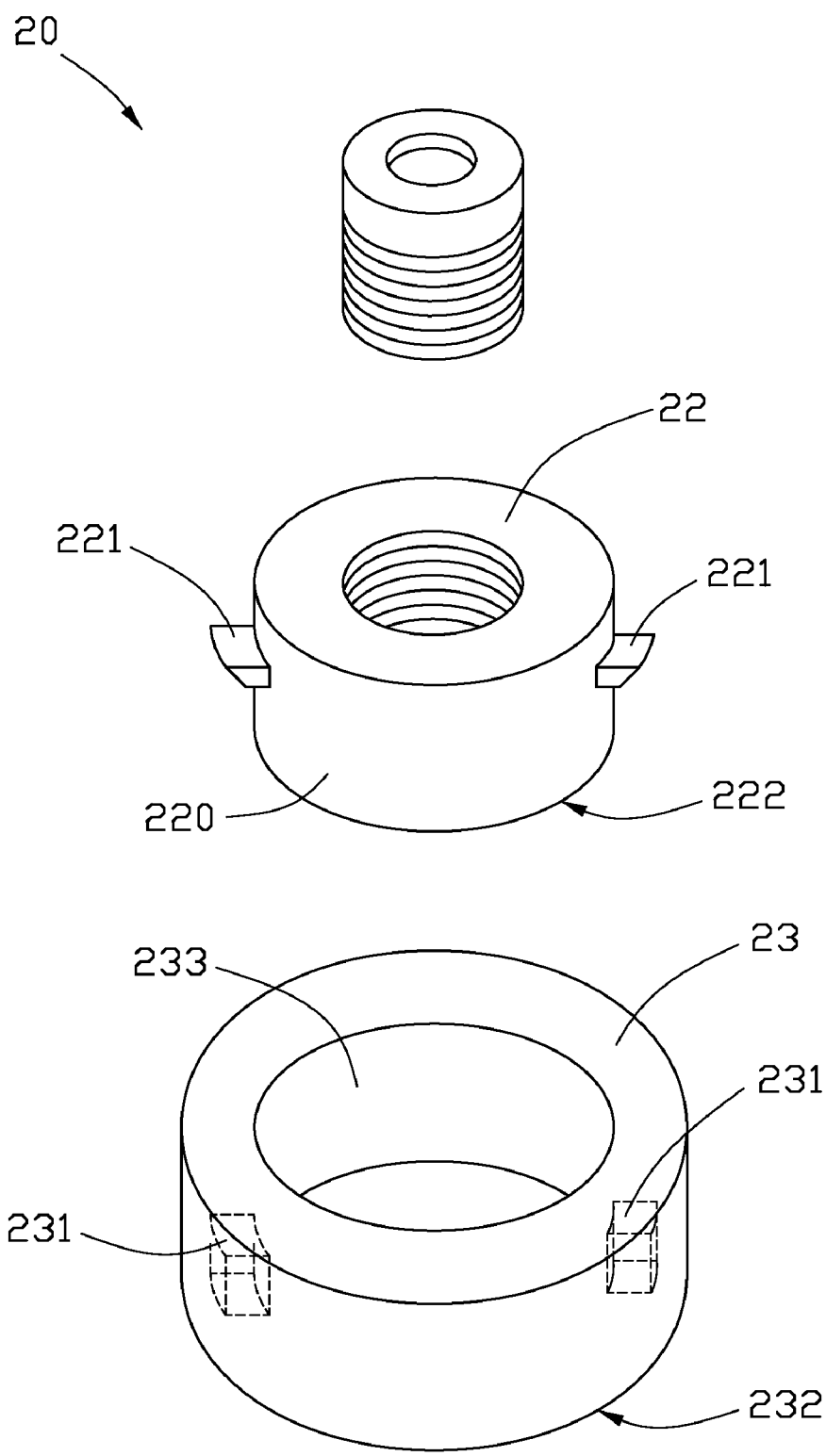
FIG. 3 is a partially dissembled isometric view of a lens module according to another exemplary embodiment.

Referring to FIG. 3, a lens module 20, according to another exemplary embodiment, is shown. Differences between the lens module 20 and the lens module 10 are that the lens holder 22 and the extension member 23 are different.

The lens holder 22 is hollow and substantially cylindrical, and includes an outer surface 220 and a holder bottom surface 222 perpendicular to the outer surface 220. Two guiding protrusions 221 are formed on the outer surface 220, radially away from the outer surface 220 and substantially symmetrical to each other.

The extension member 23 is hollow and substantially cylindrical and includes an inner surface 233 and a bottom surface 232 perpendicular to the inner surface 233. Two elongated guiding grooves 231 are defined in the inner surface 233, substantially symmetrical to each other and corresponding to the two guiding protrusions 221.

The lens holder 22 is assembled to the extension member 23 from the bottom surface 232 by two guiding protrusions 221 fixedly engaging in two elongated guiding grooves 231 respectively. Therefore, the lens holder 22 is fixedly assembled to the extension member 23.

Advantages of the lens module 20 are similar to those of the lens module 10.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens module, comprising:
   a lens barrel being a hollow cylinder and comprising an outer thread formed at an outer surface thereof;
   a lens holder, the lens barrel received in the lens holder, the lens holder comprising at least one first guiding portion and defining a through hole, the lens holder further comprising an inner thread formed in an inner wall of the through hole, the lens barrel being screwed into the through hole with the outer thread engaging with the inner thread; and
   an extension member defining a receiving through hole and comprising at least one second guiding portion corresponding to the at least one first guiding portion, the lens holder fixedly received in the receiving through hole by engagement between the at least one first guiding portion and the at least one second guiding portion.

2. The lens module of claim 1, wherein the at least one first guiding portion comprises an elongated guiding groove defined in an outer surface of the lens holder; and the at least one second guiding portion is a protrusion formed on an inner surface of the extension member in the receiving through hole.

3. The lens module of claim 1, wherein the at least one first guiding portion is a protrusion formed on an outer surface of the lens holder; and the at least one second guiding portion comprises an elongated guiding groove defined in an inner surface of the extension member in the receiving through hole.

4. The lens module of claim 1, wherein a lens group is received in the lens barrel.

5. The lens module of claim 1, wherein the lens holder is substantially cube-shaped.

6. The lens module of claim 1, wherein the lens holder is hollow and substantially cylindrical.

7. The lens module of claim 1, wherein the extension member is hollow and substantially cylindrical.

8. The lens module of claim 1, wherein the extension member comprises four side walls; and the receiving through hole is bounded by the four side walls, for fixedly receiving the lens holder therein.

9. A lens module, comprising:
a lens barrel, wherein the lens barrel is a hollow cylinder;
a substantially cube-shaped lens holder, the lens barrel received in the lens holder, the lens holder comprising at least one first guiding portion; and
a substantially cube-shaped extension member, the extension member defining a receiving through hole and comprising at least one second guiding portion corresponding to the at least one first guiding portion, the lens holder fixedly received in the receiving through hole by engagement between the at least one first guiding portion and the at least one second guiding portion.

10. The lens module of claim 9, wherein the lens barrel comprises an outer thread formed at an outer surface thereof, and the lens holder defines a through hole and further comprises an inner thread formed in an inner wall of the through hole, and the lens barrel is screwed into the through hole with the outer thread engaging with the inner thread.

11. The lens module of claim 9, wherein the lens barrel receives a lens group, the at least one first guiding portion comprises four elongated guiding grooves, with two of the guiding grooves defined in an outer side surface of the lens holder and extending parallel to an optical axis of the lens group, and the other two of the guiding grooves defined in an opposite outer side surface of the lens holder and extending parallel to the optical axis of the lens group, and the at least one second guiding portion comprises four guiding protrusions engaged in the respective guiding grooves.

12. A lens module, comprising:
a lens barrel being a hollow cylinder and comprising an outer thread formed at an outer surface thereof;
a lens holder being hollow and substantially cylindrical, the lens barrel received in the lens holder, the lens holder defining a through hole therein and comprising two guiding protrusions formed on an outer surface thereof, the lens holder further comprising an inner thread formed in an inner wall of the through hole, the lens barrel being screwed into the through hole with the outer thread engaging with the inner thread, the two guiding protrusions extending radially away from the outer surface and being substantially symmetrical to each other; and
an extension member being hollow and substantially cylindrical, the extension member defining a receiving through hole and comprising two elongated guiding grooves in an inner surface thereof corresponding to the two guiding protrusions, the lens holder fixedly received in the receiving through hole by engagement between the two guiding protrusions and the two guiding grooves.

* * * * *